P. C. HEWITT.
VAPOR ELECTRIC APPARATUS.
APPLICATION FILED FEB. 20, 1902. RENEWED APR. 11, 1904.
989,259.
Patented Apr. 11, 1911.
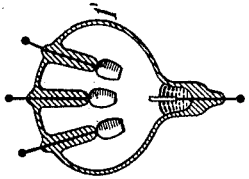
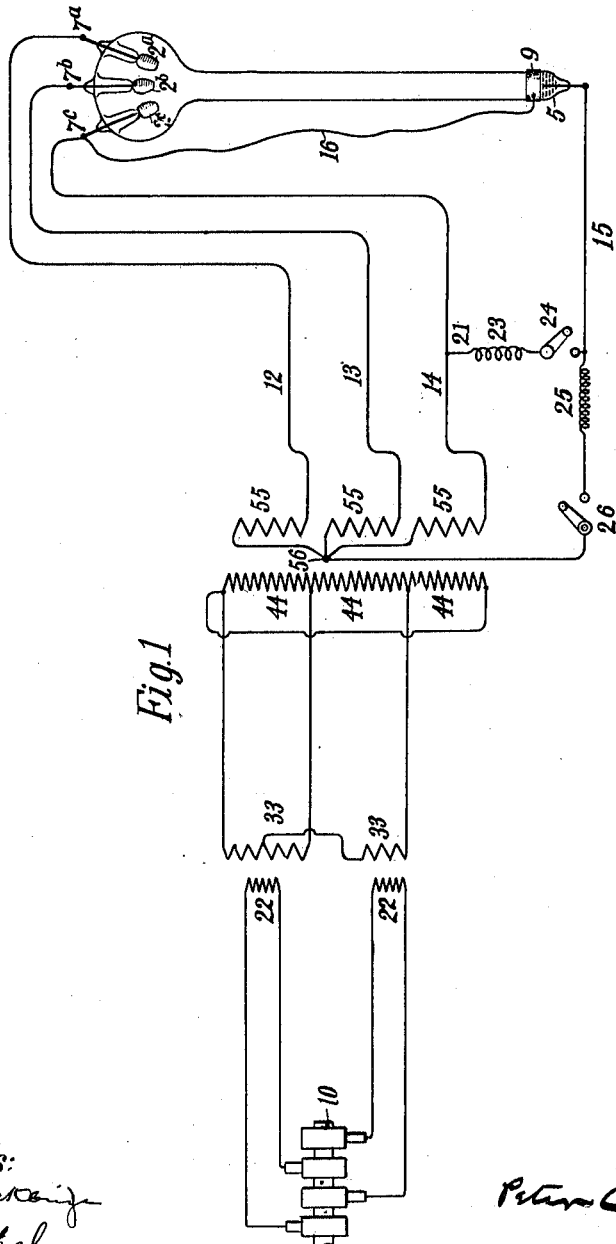
Witnesses:
Inventor
Peter Cooper Hewitt
by Charles A. Terry - Atty

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, A CORPORATION OF NEW YORK.

VAPOR ELECTRIC APPARATUS.

989,259. Specification of Letters Patent. Patented Apr. 11, 1911.

Application filed February 20, 1902, Serial No. 94,871. Renewed April 11, 1904. Serial No. 202,669.

*To all whom it may concern:*

Be it known that I, PETER COOPER HEWITT, a citizen of the United States, and a resident of New York, in the county of New York and State of New York, have invented certain new and useful Improvements in Vapor Electric Apparatus, of which the following is a specification.

In certain applications of the United States filed on the 5th day of April, 1901, and bearing respectively the Serial Numbers 54,484 and 54,485, I show and describe a method and apparatus relating to the employment of a form of gas or vapor electric lamp in connection with a source of polyphase alternating current. The device shown and described in these applications is provided with three positive electrodes and a single negative electrode, the positive electrodes being respectively connected to the terminals of a source of three-phase alternating current, while the negative electrode is connected to the neutral point of the source. In the apparatus disclosed in the applications referred to, a positive electrode is supplied for each phase of the polyphase alternating current, the several electrodes being successively introduced into the lamp circuit coincidently with the alternations of the current. In the description forming part of the applications, it is pointed out that at the negative electrode there exists an initial resistance to the entrance of the current, but once this resistance is overcome, as by the application of a starting current of relatively high potential, the lamp will be traversed continuously by the electric current under the influence of a more moderate electro-motive-force, as this resistance only exists in the initial passage of the current.

In order to take advantage of the conditions already existing in matters of electrical distribution, I now propose to derive current from the two-phase systems already widely established and transform the current into a three-phase alternating current, applying the three-phase current to the lamp after such transformation, or a polyphase current which approximates a three-phase sine wave current. In operating the lamp continuously, it is necessary that the current should always pass through the lamp in the same direction. Otherwise, the negative electrode resistance referred to above would prevent the passage of a reverse current. With the ordinary two-phase current, there are intervals in the operation during which no electro-motive-force is impressed in a given direction. In order, therefore, to be able to utilize such a two-phase current, it is necessary to transform the current into a polyphase current such as will permit a continuous flow in the same direction, and for this purpose the three-phase current seems to be especially adapted. By means of the device illustrated herein, I provide a rectifier for the three-phase current (whether used for lighting purposes or not), whereby the passage of the current is restricted to one direction through the rectifying device, and the flow of the current in the line leading to the negative electrode is also in one direction, while the flow of current to the positive electrode is intermittent as regards any selected electrode. The passage of the current as described may be utilized for the production of light in an electric gas or vapor lamp, or, if desired, an inclosed gas or vapor lamp may be utilized for rectifying purposes without transforming the current into light.

I have illustrated my invention in the accompanying drawings, in which—

Figure 1 illustrates diagrammatically the general organization of the system forming the subject of the present invention, showing also means for transforming the current into electric light; and Fig. 2 shows a rectifier capable of use in the illustrated system without the production of light for illuminating purposes.

Referring to Fig. 1 of the drawing, 10 is a suitable source of two-phase alternating electric currents, and 22, 22, are the primaries of two-phase electric transformers supplied by the said source. The secondaries of the said transformers are shown at 33, 33, and these secondaries constitute a source of supply for the primaries 44, 44, 44, of a three-phase circuit which is represented diagrammatically in the drawing. The elements of the primaries 44, 44, 44, may be arranged in delta form and may act on secondaries, 55, 55, 55, arranged in star form. The inclosing chamber of the lamp is shown at 1, the same being composed of glass or other suitable transparent material. The respective positive electrodes are shown at $2^a$, $2^b$ and $2^c$, while the negative electrode appears at 5, being here shown as consisting essentially of a small body of mercury. The positive electrodes 2ª, 2ᵇ and 2ᶜ, are respectively connected by means of wires, 12, 13 and 14, with the terminals of the transformer secondaries, 55, 55, 55, and the negative electrode 5 is joined by a wire 15, to the neutral point 56 of the transformer. I usually surround the portion of the lamp adjacent to the negative electrode with a conducting band, 9, connected by a wire 16, with either of the positive leading-in wires 7ª, 7ᵇ, 7ᶜ; or I may connect it to earth by any suitable means. The effect of this band is to aid in starting the lamp. Its action may be that of producing an electric strain at or near the negative electrode, such strain tending toward causing a discharge to pass between the electrodes, and being made effective for that purpose by a superadded impulse of higher potential impressed upon the electrodes. In order to provide a starting impulse of higher potential than that on which the lamp is to be operated (such a starting impulse having been found convenient for causing the initial operation of the lamp), I provide a shunt, 21, around the lamp between the negative side 15, and either one of the positive wires 12, 13 or 14, and include in the said shunt the resistance 23 and a switch 24. In the present instance I connect the shunt across between the wires 14 and 15, connected respectively with the solid electrode 2ᶜ and the liquid negative electrode 5 which electrodes are thus included in the circuit of the high potential starting impulse and are the starting electrodes. In the wire 15, I include a coil, 25, and a switch 26. There will be no danger of current passing from one of the positive electrodes to the other in the lamp illustrated in the drawings, since each positive is a negative with relation to each of the other positive electrodes, and so long as the negative electrode at the opposite end of the tube is broken down by the initial or starting impulse, the current will find less resistance in passing through the length of the tube than it would in attempting to pass from one positive electrode to either of the others. The switch 26 being closed it is only necessary in order to start the lamp that the described shunt should be closed through the medium of the switch 24 and then quickly broken, usually through the medium of the same switch, whereupon an impulse of higher potential is caused to traverse the tube 1 with its contained gas or vapor by way of the starting electrodes 2ᶜ and 5, and the lamp starts into operation. The switch 24 will usually be a snap or quick-break switch adapted to cause a sudden rupture of the circuit and thus produce the quick impulse described.

In Fig. 2, I show the container 1' of globular or bulbous form, the relations being such that under ordinary conditions no light will be developed in the gases or vapors inclosed within the container. With a structure such as shown in Fig. 2 inserted in place of the lamp illustrated in Fig. 1, three-phase currents would be rectified, but not converted into luminous vibrations, all of the electrodes including the starting electrode corresponding to 2ᶜ being closely adjacent to the negative electrode corresponding to 5 so that the intervening vapor column is very short.

In a divisional application, filed November 5th, 1909, Serial Number 526,341, claims are made upon certain features shown and described herein.

I claim as my invention:

1. The combination with a mercury vapor rectifier comprising an exhausted container, a plurality of anodes and a vaporizable reconstructing cathode therefor and a source of polyphase alternating current, of connections from the terminals of the polyphase supply source to the several anodes and a connection from said cathode to an intermediate point of said source, together with an inductance in the lead from said cathode and means for temporarily passing starting current through said inductance and around said rectifier.

2. The combination with a mercury vapor apparatus comprising an exhausted container, a plurality of anodes and a vaporizable reconstructing cathode therefor and a source of polyphase electric currents, of connections from the several leads of the source to the several anodes and from an intermediate point of the source to said cathode and an inductance in the lead of said cathode, together with means for utilizing current through said inductance for overcoming the negative electrode starting resistance of the apparatus and means for discontinuing said starting means whereby normal operating currents traverse said inductance.

3. The combination with a mercury vapor rectifier comprising an exhausted container, a plurality of anodes and a vaporizable reconstructing cathode therefor and a source of alternating current, of connections from the terminals of the supply source to the several anodes and a connection from said cathode to an intermediate point of said source, together with an inductance in the lead from said cathode and means for temporarily passing starting current through said inductance and around said rectifier.

4. The combination with a mercury vapor apparatus comprising an exhausted container, a plurality of anodes and a vaporizable reconstructing cathode therefor and a source of electric currents, of connections from the several leads of the source to the several anodes and from an intermediate point of the source to said cathode and an inductance in the lead of said cathode, together with means for utilizing current through said inductance for overcoming the negative electrode starting resistance of the apparatus and means for discontinuing said starting means whereby normal operating currents traverse said inductance.

5. The combination with a vapor electric apparatus comprising an exhausted container and suitable electrodes therefor, including a vaporizable reconstructing cathode, a source of alternating current and connections from said electrodes to said source, of starting and ballast means for said apparatus, said means including an inductance in the lead of said cathode.

Signed at New York in the county of New York and State of New York this eighteenth day of February A. D. 1902.

PETER COOPER HEWITT.

Witnesses:
 NELSON W. ROGERS,
 WM. H. CAPEL.

Copies of this patent may be obtained for five cents each, by addressing the "Commissioner of Patents, Washington, D. C."